(12) United States Patent
Cormode et al.

(10) Patent No.: US 7,885,911 B2
(45) Date of Patent: Feb. 8, 2011

(54) FAST APPROXIMATE WAVELET TRACKING ON STREAMS

(75) Inventors: Graham R. Cormode, Summit, NJ (US); Minos N. Garofalakis, San Francisco, CA (US)

(73) Assignee: Alcatel-Lucent USA Inc., Murray Hill, NJ (US)

( * ) Notice: Subject to any disclaimer, the term of this patent is extended or adjusted under 35 U.S.C. 154(b) by 1356 days.

(21) Appl. No.: 11/389,040

(22) Filed: Mar. 24, 2006

(65) Prior Publication Data
US 2007/0237410 A1    Oct. 11, 2007

(51) Int. Cl.
G06F 17/00 (2006.01)
G06N 5/02 (2006.01)
G06F 15/18 (2006.01)
(52) U.S. Cl. .......................... 706/46; 706/14
(58) Field of Classification Search ............... 706/14, 706/45, 46
See application file for complete search history.

(56) References Cited

U.S. PATENT DOCUMENTS

2004/0231498 A1*  11/2004  Li et al. .................. 84/634

OTHER PUBLICATIONS

Ganguly, S. et al. "Join-Distinct Aggregate Estimation over Update Streams". ACM. Jun. 2005. pp. 259-270.*
N. Alon, P. B. Gibbons, Y. Matias, and M. Szegedy. "Tracking join and self-join sizes in limited storage". In ACM PODS, 1999.
N. Alon, Y. Matias, and M. Szegedy. "The space complexity of approximating the frequency moments". In ACM STOC, 1996.
B. Babcock, S. Babu, M. Datar, R. Motwani, and Jennifer Widom. "Models and issues in data stream systems". In ACM PODS, 2002.
K. Chakrabarti, M. N. Garofalakis, R. Rastogi, and K. Shim. "Approximate query processing using wavelets". In VLDB, 2000.
M. Charikar, K. Chen, and M. Farach-Colton. "Finding frequent items in data streams". In ICALP, 2002.
G. Cormode and S. Muthukrishnan. "What's hot and what's not: Tracking most frequent items dynamically". In ACM PODS, 2003.
G. Cormode and S. Muthukrishnan. "What's new: Finding significant differences in network data streams". In IEEE Infocom, 2004.
A. Deligiannakis and N. Roussopoulos. "Extended wavelets for multiple measures". In ACM SIGMOD, 2003.
A. Dobra, M. N. Garofalakis, J. Gehrke, and R. Rastogi. "Processing complex aggregate queries over data streams". In ACM SIGMOD, 2002.

(Continued)

*Primary Examiner*—Donald Sparks
*Assistant Examiner*—Benjamin Buss
(74) *Attorney, Agent, or Firm*—Wall & Tong, LLP

(57) ABSTRACT

The first fast solution to the problem of tracking wavelet representations of one-dimensional and multi-dimensional data streams based on a stream synopsis, the Group-Count Sketch (GCS) is provided. By imposing a hierarchical structure of groups over the data and applying the GCS, our algorithms can quickly recover the most important wavelet coefficients with guaranteed accuracy. A tradeoff between query time and update time is established, by varying the hierarchical structure of groups, allowing the right balance to be found for specific data streams. Experimental analysis confirmed this tradeoff, and showed that all the methods significantly outperformed previously known methods in terms of both update time and query time, while maintaining a high level of accuracy.

15 Claims, 9 Drawing Sheets

OTHER PUBLICATIONS

M. Garofalakis and A. Kumar. "Deterministic Wavelet Thresholding for Maximum-Error Metrics". In ACM PODS, 2004.

A. Gilbert, Y. Kotidis, S. Muthukrishnan, and M. Strauss. "One-pass wavelet decomposition of data streams". IEEE TKDE, 15(3), 2003.

A. Gilbert, S. Guha, P. Indyk, Y. Kotidis, S. Muthukrishnan, and M. Strauss. "Fast, smallspace algorithms for approximate histogram maintenance". In ACM STOC, 2002.

A. Gilbert, Y. Kotidis, S. Muthukrishnan, and M. Strauss. "How to summarize the universe: Dynamic maintenance of quantiles". In VLDB, 2002.

M. Jahangiri, D. Sacharidis, and C. Shahabi. "Shift-Split: I/O efficient maintenance of wavelet-transformed multidimensional data". In ACM SIGMOD, 2005.

B. Jawerth and W. Sweldens. "An Overview of Wavelet Based Multiresolution Analyses". SIAM Review, 36(3) 1994.

G.S. Manku and R. Motwani. "Approximate frequency counts over data streams". In VLDB, 2002.

Y. Matias, J.S. Vitter, and M. Wang. "Wavelet-based histograms for selectivity estimation". In ACM SIGMOD, 1998.

S. Muthukrishnan. Data streams: algorithms and applications. In SODA, 2003.

R.R. Schmidt and C. Shahabi. "Propolyne: A fast wavelet-based technique for progressive evaluation of polynomial range-sum queries". In EDBT, 2002.

E. J. Stollnitz, T. D. Derose, and D. H. Salesin. "Wavelets for computer graphics: theory and applications". Morgan Kaufmann Publishers, 1996, pp. 1-20.

N. Thaper, S. Guha, P. Indyk, and N. Koudas. "Dynamic multidimensional histograms". In ACM SIGMOD, 2002.

J.S. Vitter and M. Wang. "Approximate computation of multidimensional aggregates of sparse data using wavelets". In ACM SIGMOD, 1999.

* cited by examiner

FAST APPROXIMATE WAVELET TRACKING ON STREAMS

FIELD OF THE INVENTION

The present invention generally relates to the fields of database management, Internet management, network management and monitoring applications and, in particular, relates to tracking wavelet representations of one-dimensional and multi-dimensional data streams based on a stream synopsis called the Group-Count Sketch (GCS).

BACKGROUND OF THE INVENTION

Recent years have seen growing interest in effective algorithms for summarizing and querying massive, high-speed data streams. Randomized sketch synopses provide accurate approximations for general-purpose summaries of the streaming data distribution (e.g., wavelets). The focus of existing work has typically been on minimizing space requirements of the maintained synopsis. However, to support high-speed data-stream analysis effectively, a crucial practical requirement is to optimize: (1) the update time for incorporating a streaming data element in the sketch; and (2) the query time for producing an approximate summary (e.g., the top wavelet coefficients) from the sketch. Such time costs must be small enough to cope with rapid stream-arrival rates and the real-time querying requirements of typical streaming applications (e.g., ISP network monitoring).

SUMMARY

Exemplary embodiments of the present invention use a hash-based probabilistic synopsis data structure, termed a Group-Count Sketch (GCS) to estimate the energy of fixed groups of elements from a vector under a streaming model.

One embodiment is a method for approximate wavelet tracking. A wavelet coefficient vector is sketched as updates arrive in a streaming model. Updates are performed by using a hash-based grouping and search technique on a group-count sketch (GCS) synopsis. An estimate of the energy of one or more groups of elements from the wavelet coefficient vector is provided. Another embodiment is a computer readable medium storing instructions for performing this method.

In one embodiment, the GCS synopsis is used to track a set of large wavelet coefficients, where the set of large wavelet coefficients are identified in polylogarithmic time. In one embodiment, the GCS synopsis comprises a three-dimensional array indexed by a repetition index, a bucket index, and a sub-bucket index. In one embodiment, the hash-based group and search technique comprises, for each repetition, computing the bucket index using a first hash function and computing the sub-bucket index using a second hash function; and locating an element to update in the GCS synopsis with the bucket index and the sub-bucket index. In one embodiment, the method has sublinear synopsis space, sublinear per-item update time, and sublinear query time.

Another embodiment is a system for approximate wavelet tracking, including a sketching component, an update component, and an estimator. The sketching component sketches a wavelet coefficient vector as updates arrive in a streaming model. The update component performs updates by using a hash-based grouping and search technique on a group-count sketch (GCS) synopsis. The estimator provides an estimate of the energy of one or more groups of elements from the wavelet coefficient vector.

BRIEF DESCRIPTION OF THE DRAWINGS

The teachings of the present invention can be readily understood by considering the following detailed description in conjunction with the accompanying drawings, in which.

To facilitate understanding, identical reference numerals have been used, where possible, to designate identical elements that are common to the figures.

DETAILED DESCRIPTION OF THE INVENTION

Figure 1A:
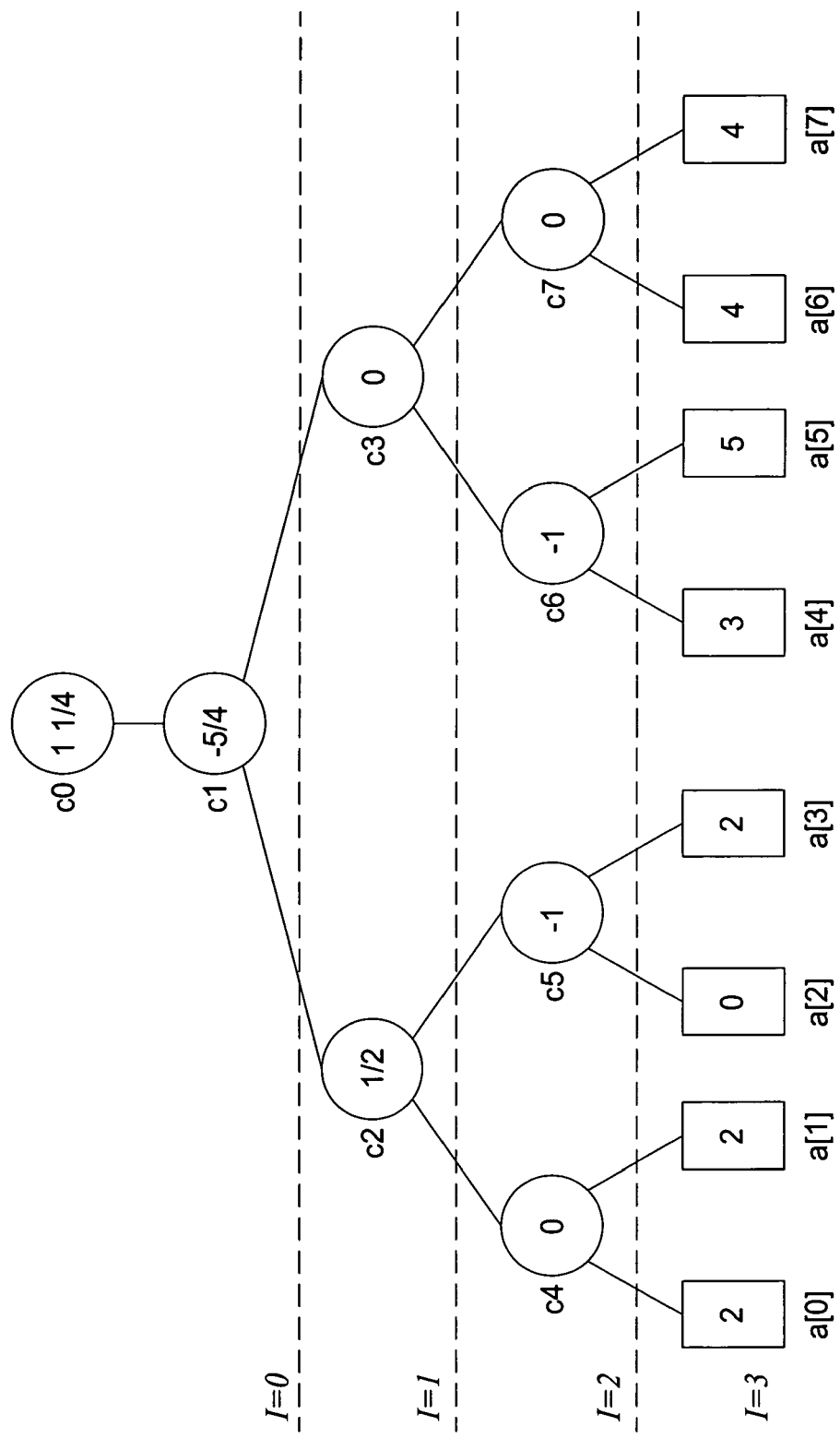
FIGS. 1A and 1B illustrate example error-tree structures.

The present invention will primarily be described within the general context of exemplary embodiments of methods for fast approximate wavelet tracking on streams. However, those skilled in the art and informed by the teachings herein will realize that the invention is generally applicable to any kind of wavelet applications, such as database management, computer graphics, physical simulation, Internet management, or network management, and any kind of monitoring application, such as distributed data centers/web caches, sensor networks, power grid monitoring, monitoring habitat and environmental parameters, tracking objects, monitoring intrusions, trend analysis, monitoring customer usage patterns, etc.

Exemplary embodiments solve the problem of tracking wavelet representations of one-dimensional and multi-dimensional data streams based on a stream synopsis called the Group-Count Sketch (GCS). By imposing a hierarchical structure of groups over the data and applying the GCS, the algorithms quickly recover the most important wavelet coefficients with guaranteed accuracy. A tradeoff between query time and update time is established, by varying the hierarchical structure of groups, allowing the right balance to be found for each specific data stream. Experimental analysis confirmed this tradeoff and showed that exemplary embodiments of all of the methods significantly outperformed previously known methods in terms of both update time and query time, while maintaining a high level of accuracy.

Introduction

Driven by the enormous volumes of data communicated over today's Internet, several emerging data-management applications depend on the ability to continuously generate, process, and analyze massive amounts of data in real-time. A typical example domain comprises the class of continuous event-monitoring systems that are deployed in a wide variety of settings, ranging from network-event tracking in large ISPs to transaction log monitoring in large web server farms and satellite-based environmental monitoring. For instance, tracking the operation of a nationwide ISP network requires monitoring detailed measurement data from thousands of network elements across several different layers of network infrastructure. The volume of such monitoring data can easily become overwhelming (in the order of terabytes per day). To deal effectively with the massive volume and continuous highest-speed nature of data in such environments, the data-streaming paradigm has proven vital. Unlike conventional database query processing engines that requires several (expensive) passes over a static archived data image, streaming data analysis algorithms rely on building concise, approximate (but highly accurate) synopses of the input data streams in real-time (i.e., in one pass over the streaming data). Such synopses typically require space that is significantly sublinear in the size of the data and these synopses can be used to provide approximate query answers with guarantees on the quality of the approximation. With cheap and plentiful memory, space is often only a secondary concern after query/update time costs. In many monitoring scenarios, it is neither desirable nor necessary to maintain the data in full; instead, stream synopses can be used to retain enough information for the reliable reconstruction of the key features of the data required in analysis.

The collection of the top (i.e., largest) coefficients in the wavelet transform (or, decomposition) of an input data vector is one example of such a key feature of the stream. Wavelets provide a mathematical tool for the hierarchical decomposition of functions, with a long history of successful applications in signal and image processing. Applying the wavelet transform to a (one- or multi-dimensional) data vector and retaining a select, small collection of the largest wavelet coefficients gives a very effective form of lossy data compression. Such wavelet summaries provide concise, general-purpose summaries of relational data, and can form the foundation for fast and accurate approximate query processing algorithms, such as approximate selectivity estimates, on line analytical processing (OLAP) range aggregates and approximate join and multi-join queries. Wavelets summaries can also give accurate (one- or multi-dimensional) histograms of the underlying data vector at multiple levels of resolution, thus providing valuable primitives for effective data visualization.

Most earlier stream-summarization work focuses on minimizing the space requirements for a given level of accuracy (in the resulting approximate wavelet representation), while the data vector is being rendered as a stream of arbitrary point updates. However, while space is an important consideration, it is certainly not the only parameter of interest. To support high-speed data-stream analyses effectively, two additional key parameters of the streaming algorithm are: (1) the update time for incorporating a streaming update in the sketch, and (2) the query time for producing an approximate summary (e.g., the top wavelet coefficients) from the sketch. Minimizing query and update times is a crucial requirement to cope with rapid stream-arrival rates and the real-time querying needs of modern streaming applications. Furthermore, there are essential trade-offs between the above three parameters (i.e., space, query time, and update time) and it can be argued to that space usage is often the least important of these. For instance, consider monitoring a stream of active network connections for the users consuming the most bandwidth (commonly referred to as the "top talkers" or "heavy hitters"). Typical results for this problem give a stream-synopsis space-requirement of $$O\left(\frac{1}{\varepsilon}\right),$$

meaning that an accuracy of $\varepsilon=0.1\%$ requires only a few thousands of storage locations, i.e., a few kilobytes, which is of little consequence at all in today's off-the-shelf systems featuring gigabytes of main memory. One issue surrounding using very small space is whether the data structure fits into the faster cache memory, which again emphasizes the importance of running time costs. Now, suppose that the network is processing IP packets, on average, a few hundred bytes in length at a rate of hundreds of Mbps; essentially, this implies that the average processing time per packet must be much less than one millisecond: an average system throughput of tens to hundreds of thousands of packets per second. Thus, while synopsis space is probably a non-issue in this setting, the Times to update and query the synopsis can easily become an insurmountable bottleneck. To scale to such high data speeds, streaming algorithms must guarantee provably small time costs for updating the synopsis in real-time. Small query times are also important, requiring near real-time response (e.g., for detecting and reacting to potential network attacks). In summary, there is a need for fast item processing, fast analysis, and bounded space usage. Different scenarios place different emphasis on each parameter, but, in general, more attention needs to be paid to the time costs of streaming algorithms.

Exemplary embodiments include streaming algorithms for space-efficient and time-efficient tracking of approximate wavelet summaries for both one-dimensional and multi-dimensional data streams. This approach relies on a sketch-based stream synopsis structure, termed the Group-Count Sketch (GCS) that provides space/accuracy trade-offs similar to the conventional simple sketches, while guaranteeing: (1) small, logarithmic update times (essentially touching only a small fraction of the GCS for each streaming update) with a simple, fast, hash functions; and (2) polylogarithmic query times for computing the top wavelet coefficients from the GCS. In brief, these GCS algorithms rely on two technical ideas. First, work is done entirely in the wavelet domain, in the sense that wavelet coefficients are directly sketched, rather then the original data vector, as updates arrive. Second, the GCSs employee group structures based on hashing and hierarchical decomposition over the wavelet domain to enable fast updates and efficient binary-search-like techniques for identifying the top wavelet coefficients in sublinear time. It was demonstrated that, by varying the degree of the search procedure, the trade-off between update and query costs in the GCS synopses could be effectively explored. The GCS algorithms and results also naturally extend to both the standard and non-standard form of the multi-dimensional wavelet transform, essentially providing the only known efficient solution for streaming wavelets in more than one dimension. As the experimental results with both synthetic and real-life data showed, they allowed very fast update and searching and were capable of supporting very high-speed data sources.

Preliminaries

Stream Processing Model and Stream Sketches

In one embodiment, input comprises a continuous stream of update operations, rendering a data vector a of N values (i.e., the data-domain size). Without loss of generality, assume that the index of the data vector takes values in the integer domain $[N]=\{0,\ldots,N-1\}$, where N is a power of two (to simplify the notation). Each streaming update is a pair of the form $<i,\pm v>$, denoting a net change of $\pm v$ in the a[i] entries; that is, the effect of the update is to set $a[i]\rightarrow a[i]\pm v$. Intuitively, "+v" ("−v") can be seen as v insertions (respectively, deletions) of the ith vector element, but, more generally, entries are allowed to take negative values. One embodiment is a model that instantiates the most general and, hence, most demanding turnstile model of streaming computations. The model generalizes to multi-dimensional data: for d data dimensions, a is a d-dimensional vector (tensor) and each update $<(i_1, \ldots, i_d), \pm v>$ effects and net change of $\pm v$ on entry $a[i_1, \ldots, i_d]$. Without loss of generality, assume a domain of $[N]^d$ for the d-dimensional case. Different dimension sizes can be handled in a straightforward manner. Further, the methods do not need to know the domain size N beforehand; standard adaptive techniques can be used.

In the data-streaming context, updates are only seen once in the (fixed) order of arrival; furthermore, the rapid data-arrival rates and large data-domain size N make it impossible to store a explicitly. Instead, exemplary embodiments of the algorithms can only maintain a concise synopsis of the stream that requires only sublinear space and, at the same time, can (a) be maintained in small, sublinear processing time per update, and (b) provide query answers in sublinear time. Sublinear means polylogarithmic in N, the data-vector size. One embodiment of the techniques guarantees update times that are sublinear in the size of the synopsis.

Randomized AMS Sketch Synopses for Streams

The randomize AMS sketch is a broadly applicable stream synopsis structure based on maintaining randomize linear projections of the streaming input data vector a. Briefly, an atomic AMS sketch of a is simply the inner product $<a,\xi>=\Sigma_i a[i]\xi(i)$ where $\xi$ denotes a random vector of four-wise independent $\pm 1$-valued random variates. Such variates can be easily generated online through standard pseudo random hash functions $\xi(\ )$ using only $O(\log N)$ space (for seeding). To maintain this inner product over the stream of updates to a, initialize a running counter N to zero and set $X \leftarrow X \pm v\xi(i)$ whenever the update $(i, \pm v)$ is seen in the input stream. An AMS sketch of a comprises several independent atomic AMS sketches (i.e., randomized counters), each with a different random hash function $\xi(\ )$. The following theorems summarizes the key property of AMS sketches for stream-query estimation, where $\|v\|_2$ denotes the $L_2$-norm of a vector v, so $\|V\|_2 = \sqrt{<v,v>} = \sqrt{\Sigma_i v[i]^2}$.

Theorem 1

Consider two (possibly streaming) data vector a and b and let Z denote the $$O\left(\log\left(\frac{1}{\delta}\right)\right) - \text{wise median of } O\left(\frac{1}{\varepsilon^2}\right) - \text{wise}$$

means of independent copies of the atomic AMS sketch product $(\Sigma_i a[i]\xi_j(i))(\Sigma_i b[i]\xi_j(i))$. Then, $|Z - <a,b>| \leq \varepsilon \|a\|_2 \|b\|_2$ with probability $\geq 1 - \delta$.

Thus, using AMS sketches comprising only $$O\left(\frac{\log\left(\frac{1}{\delta}\right)}{\varepsilon^2}\right)$$

atomic counters. The vector inner product $<a,b>$ can be approximated to within $\pm \varepsilon \|a\|_2 \|b\|_2$; hence, implying an $\varepsilon$-relative error estimate for $\|a\|_2^2$.

Discrete Wavelet Transform Basics

The discrete wavelet transform (DWT) is a useful mathematical tool for hierarchically decomposing functions in ways that are both efficient and theoretically sound. Broadly speaking, the wavelet decomposition of a function comprises a coarse overall of approximation, together with detail coefficients that influence the function at various scales. Haar wavelets represent the simplest DWT basis: they are conceptually simple, easy to implement, and have proven their effectiveness as a data-summarization tool in a variety of settings.

One-Dimensional Haar Wavelets

Consider the one-dimensional data vector $a=[2,2,0,2,3,5,4,4](N=8)$. The Haar DWT of a is computed as follows. First, average the values together pairwise to get a new "lower-resolution" representation of the data with the pairwise averages $$\left[\frac{2+2}{2}, \frac{0+2}{2}, \frac{3+5}{2}, \frac{4+4}{2}\right] = [2, 1, 4, 4].$$

This averaging loses some of the information in a. To restore the original a values, detailed coefficients are needed that capture the missing information. In the Haar DWT, these detailed coefficients are the differences of the (second of the) averaged values from the computed pairwise average. Thus, in this simple example, for the first pair of averaged values, the detail coefficient is zero, because $2-2=0$, for the second it is $-1$, because $1-2=-1$. No information is lost in this process; the eight values of the original data array can be reconstructed from the lower-resolution array containing the four averages of the four detail coefficients. Recursively apply this pairwise averaging and differencing process on the lower-resolution array of averages until the overall average is reached to get the full Haar decomposition. The final Haar DWT of a is given by $$w_a = \left[\frac{11}{4}, -\frac{5}{4}, \frac{1}{2}, 0, 0, -1, -1, 0\right],$$

which is the overall average followed by the detail coefficients in order of increasing resolution. Each entry in $w_a$ is called the wavelet coefficient. The main advantage of using $w_a$ instead of the original data vector a is that for vectors containing similar values, most of the detail coefficients tend to have very small values. Thus, eliminating such small coefficients from the wavelet transform (i.e., treating them as zeros) introduces only small errors when reconstructing the original data, resulting in a very effective form of lossy data compression.

Figure 1B:
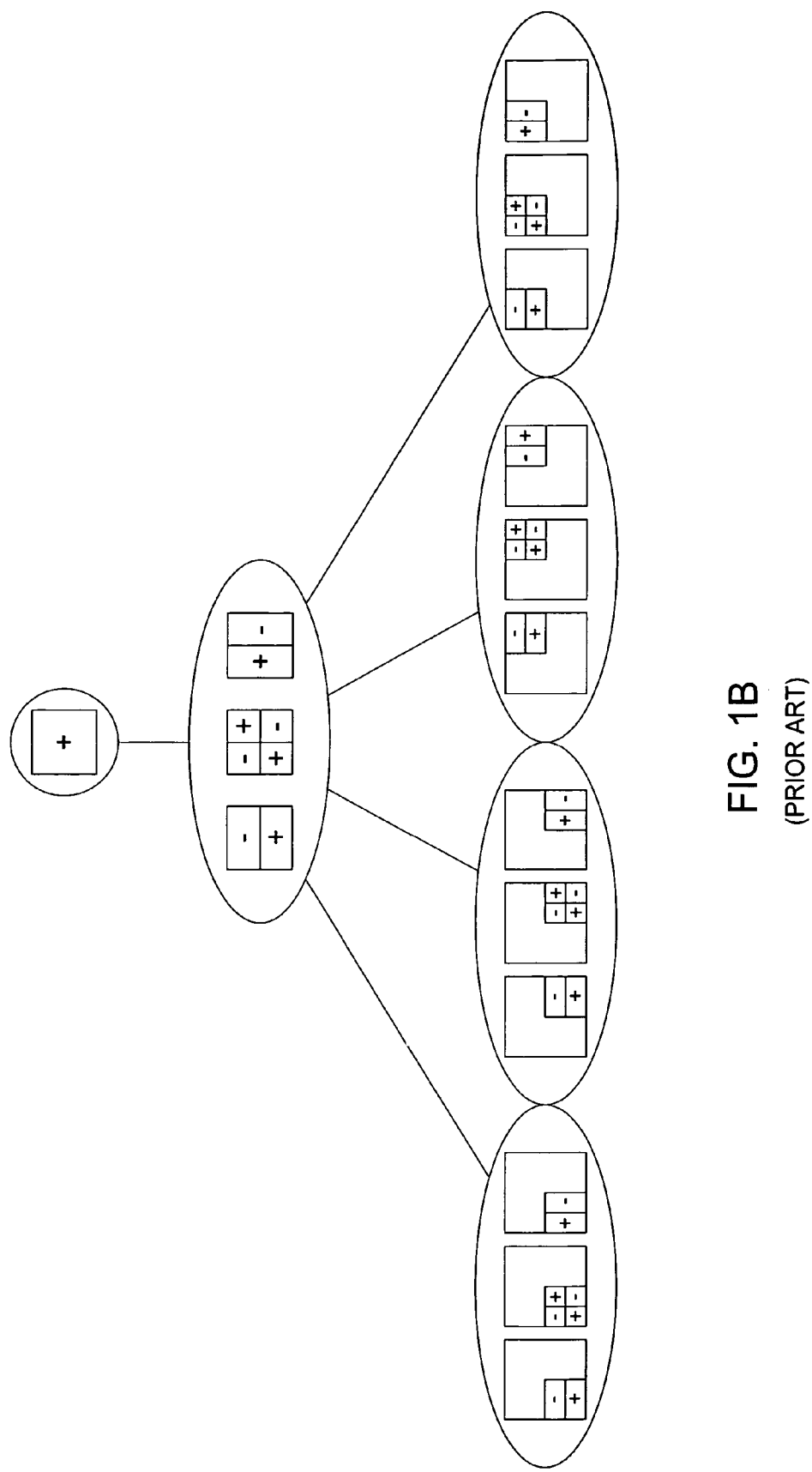

FIGS. 1A and 1B illustrate example error-tree structures for a one-dimensional data array (N=8) and non-standard two-dimensional Haar coefficients for a 4×4 data array (coefficient magnitudes are multiplied by $+1$ ($=1$) in the "+" (resp., "−") labeled ranges and zero in blank areas). A useful conceptual tool for visualizing an understanding the (hierarchical) Haar DWT process is the error tree structure shown in FIG. 1A for the example array a. Each internal tree node $c_i$ corresponds to a wavelet coefficient (with the root node $c_0$ being the overall average), and leaf nodes $a[i]$ correspond to the original data-array entries. This view shows the reconstruction of any $a[i]$ depends only on the $\log N+1$ coefficients in the path between the roots and $a[i]$; symmetrically, it means a change in $a[i]$ only impacts its $\log N+1$ ancestors in an easily computable way. The support for a coefficient $c_i$ is defined as the contiguous range of data-array that $c_i$ is used to reconstruct (i.e., the range of data/leaf nodes in the subtree rooted at $c_i$). Note that these supports of all coefficients at resolution level l of the Haar DWT are exactly the $2^l$ (disjoint), dyadic ranges of size $N/2^l = 2^{\log N - l}$ over $[N]$, defined as $R_{l,k} = [k \cdot 2^{\log N - l}, \ldots, (k+1) \cdot 2^{\log N - l} - 1]$ for $k = 0, \ldots, 2^l - 1$ (for each resolution level $l=0, \ldots, \log N$). The Haar DWT can also be conceptualized in terms of vector inner-products computations: let $\phi_{l,k}$ denote the vector with $\phi_{l,k}=2^{l-\log N}$ for $i\epsilon R_{l,k}$ and 0 otherwise, for $l=0, \ldots, \log N$ and $k=0, \ldots, 2^l-1$; then, each of the coefficients in the Haar DWT of a can be expressed as the inner-product of a with one of the N distinct Haar wavelet basis vectors:

$$\left\{ \frac{1}{2}(\phi_{l+1,2k} - \phi_{l+1,2k+1}): l = 0, \ldots, \log N - 1; k = 0, \ldots, 2^l - 1 \right\} \cup \{\phi_{0,0}\}.$$

Intuitively, wavelet coefficients with larger support carry a higher weight in the reconstruction of the original data values. To equalize the importance of all Haar DWT coefficients, a common normalization scheme is to scale the coefficient values at level l (or, equivalently, the basis vectors $\phi_{l,k}$) by a factor of $$\sqrt{\frac{N}{2^l}}.$$

This normalization essentially turns the Haar DWT basis vectors into an orthonormal basis. Letting $c_i^*$ denote the normalized coefficient values, this fact has two important consequences: (1) the energy of the a vector is preserved in the wavelet domain, that is, $\|a\|_2^2 = \Sigma_i a[i]^2 = \Sigma_i (c_i^*)^2$ (by Parseval's theorem); and (2) retaining the $\beta$ largest coefficients in terms of absolute normalized value gives the (provably) best $\beta$-term approximation in terms of sum-squared-error (SSE) in the data reconstruction (for a given budget of coefficients $\beta$).

Multi-Dimensional Haar Wavelets

There are two distinct ways to generalize the Haar DWT to the multi-dimensional case, the standard and nonstandard Haar decomposition. Each method results from a natural generalization of the one-dimensional decomposition process described above, and both have been used in a wide variety of applications. Consider the case where a is a d-dimensional data array, comprising $N^d$ entries. As in the one-dimensional case, the Haar DWT of a results in a d-dimensional wavelet-coefficient array $w_a$ with $N^d$ coefficient entries. The non-standard Haar DWT works in log N phases where, in each phase, one step of pairwise averaging and differencing is performed across each of the d dimensions; the process is then repeated recursively (for the next phase) on the quadrant containing the averages across all dimensions. The standard Haar DWT works in d phases, where, in each phase, a complete one-dimensional DWT is performed, for each one-dimensional row of array cells along dimension k, for all $k=1, \ldots, d$. The supports of non-standard d-dimensional Haar coefficients are d-dimensional hyper-cubes (over dyadic ranges in $[N]^d$), because they combine one-dimensional basis functions from the same resolution levels across all dimensions. The cross product of a standard d-dimensional coefficient (indexed by, say, $(i_1, \ldots, i_d)$ is, in general, a d-dimensional hyper-rectangle, given by the cross product of the one-dimensional basis functions corresponding to coefficient indexes $i_1, \ldots, i_d$.

Error-tree structures can again be used to conceptualize the properties of both forms of d-dimensional Haar DWT's. In the non-standard case, the error tree is essentially a quadtree (with a fanout of $2^d$), where all internal non-root nodes contain $2^d-1$ coefficients that have the same support region in the original data array, but with different quadrant signs (and magnitudes) for their contribution. For standard d-dimensional Haar DWT, the error-tree structure is essentially a "cross-product" of d one-dimensional error trees with the support and signs of coefficient $(i_1, \ldots, i_d)$ determined by the product of the component one-dimensional basis vectors (for $i_1, \ldots, d$). FIG. 1B depicts a simple example error-tree structure for the non-standard Haar DWT of a two-dimensional 4×4 data array. It follows that updating a single data entry in the d-dimensional data array a impacts the values of $(2^d-1)\log N+1=O(2^d \log N)$ coefficients in the non-standard case, and $(\log N+1)^d=O(\log^d N)$ coefficients in the standard case. Both multi-dimensional decompositions preserve the orthonormality, thus retaining the largest $\beta$ coefficient values gives a provably SSE-optimal $\beta$-term approximation of a.

Problem Formulation and Overview of Approach

One goal of exemplary embodiments is to track a compact $\beta$-coefficient wavelet synopsis continuously under a general, high-speed update-stream model. Exemplary embodiments satisfy all three key requirements for streaming algorithms outlined earlier, namely: (1) sublinear synopsis space, (2) sublinear per-item update time, and (3) sublinear query time, where sublinear means polylogarithmic in the domain size N. Exemplary embodiments include algorithms that return only an approximate synopsis comprising (at most), Haar coefficients, that is provably near optimal (in terms of the captured energy of the underlying vector) assuming that the vector satisfies the "small-$\beta$ property" (i.e., most of its energy is concentrated in a small number of Haar DWT coefficients). This assumption is typically satisfied for most real-life data distributions.

The streaming algorithm GKMS focuses primarily on the one-dimensional case. The key idea is to maintain AMS sketch for the streaming data vector a. To produce the approximate $\beta$-term representation, GKMS employs the constructed sketch of a to estimate the inner product of a with all wavelet basis vectors, essentially performing an exhaustive search over the space of all wavelet coefficients to identify important ones. Although techniques based on range-summable random variables constructed using Reed-Muller codes were proposed to reduce or amortize the cost of this exhaustive search by allowing the sketches of basis vectors to be computed more quickly, the overall query time for discovering the top coefficients remain sublinear in N (i.e., at least $$\Omega\left(\frac{1}{\varepsilon^2} N \log N\right)),$$

violating the third requirement. For large data domains, say $N=2^{32}\approx 4$ billion (such as the IP address domain), a query can take a very long time: over an hour, even if a million coefficient queries can be answered per second! This essentially renders a direct extension of the GKMS technique to multiple dimensions infeasible, because it implies an exponential explosion in query cost (requiring at least $O(N^d)$ time to cycle through all coefficients in d dimensions). In addition, the update cost of the GKMS algorithm is linear in the size of the sketch, because the whole data structure must be "touched" for each update. This is problematic for high-speed data streams and/or even moderate sized sketch synopses.

One Approach

Exemplary embodiments rely on two key ideas to avoid the shortcomings of the GKMS technique. First, work is done entirely in the wavelet domain: instead of sketching the original data entries, exemplary embodiments include an algorithm that sketches the wavelet-coefficient vector $w_a$ as updates arrive. This avoids any need for complex range-summable hash functions. Second, hash-based grouping is employed in conjunction with efficient binary-search-like techniques to enable very fast updates as well as identification of important coefficients in the polylogarithmic time.

Sketching in the Wavelet Domain

A first technical idea relies on the observation that sketch synopses of the stream can be efficiently produced directly in the wavelet domain. That is, the impact of each streaming update is translated on the relevant wavelet coefficients. By the linearity properties of the DWT, it is known that an update to the data entries corresponds to only polylogarithmically many coefficients in the wavelet domain. Thus, on receiving an update to a, exemplary embodiments of the algorithms directly convert it to $O(polylog(N))$ updates to the wavelet coefficients, and maintain an approximate representation of the wavelet coefficient vector $w_a$.

Time-Efficient Updates and Large-Coefficient Searches

Sketching in the wavelet domain means that, at query time, there is an approximate representation of the wavelet coefficient vector $w_a$ and there is a need to identify all those coefficients that are "large", relative to the total energy of the data $\|w_a\|_2^2 = \|a\|_2^2$. While AMS sketches can give these estimates (a point query is just a special case of an inner product), querying remains much too slow, taking at least $$\Omega\left(\frac{1}{\varepsilon^2}N\right)$$

to find which of the N coefficients are the β largest. Although earlier work has given efficient streaming algorithms for identifying high-frequency items, exemplary embodiments are quite different. Exemplary embodiments monitor items (i.e., DWT coefficients), whose values increase and decrease over time, and which may very well be negative (even if all the data entries in a are positive). Existing work on "heavy-hitter" tracking focuses solely on non-negative frequency counts often assumed to be non-decreasing. More strongly, items must be found whose squared value is a large fraction of the total vector energy $\|w_a\|_2^2$: this is a stronger condition, because such "$L_2^2$ heavy hitters" may not be heavy hitters under the conventional sum-of-counts definition. For example, consider a set of items with counts {4,1,1,1,1,1,1,1,1}. The item with count 4 represents $$\frac{2}{3}$$

of the sum of the squared counts, but only $$\frac{1}{3}$$

of the sum of counts.

At a high level, exemplary embodiments of the algorithms rely on a divide-and-conquer or binary-search-like approach for finding the large coefficients. To implement this, the ability to estimate sum-of-squares efficiently is needed for groups of coefficients, corresponding to dyadic subranges of the domain [N]. Then, low energy regions are disregarded and recursion is performed only on high-energy groups. This guarantees no false negatives, as a group that contains a high-energy coefficient will also have high energy as a whole. Furthermore, exemplary embodiments of the algorithms also employ randomized, hash-based grouping of dyadic groups and coefficients to guarantee that each update only touches a small portion of the synopsis, thus guaranteeing very fast update times.

GCS Synopsis and Algorithms

Figure 2:
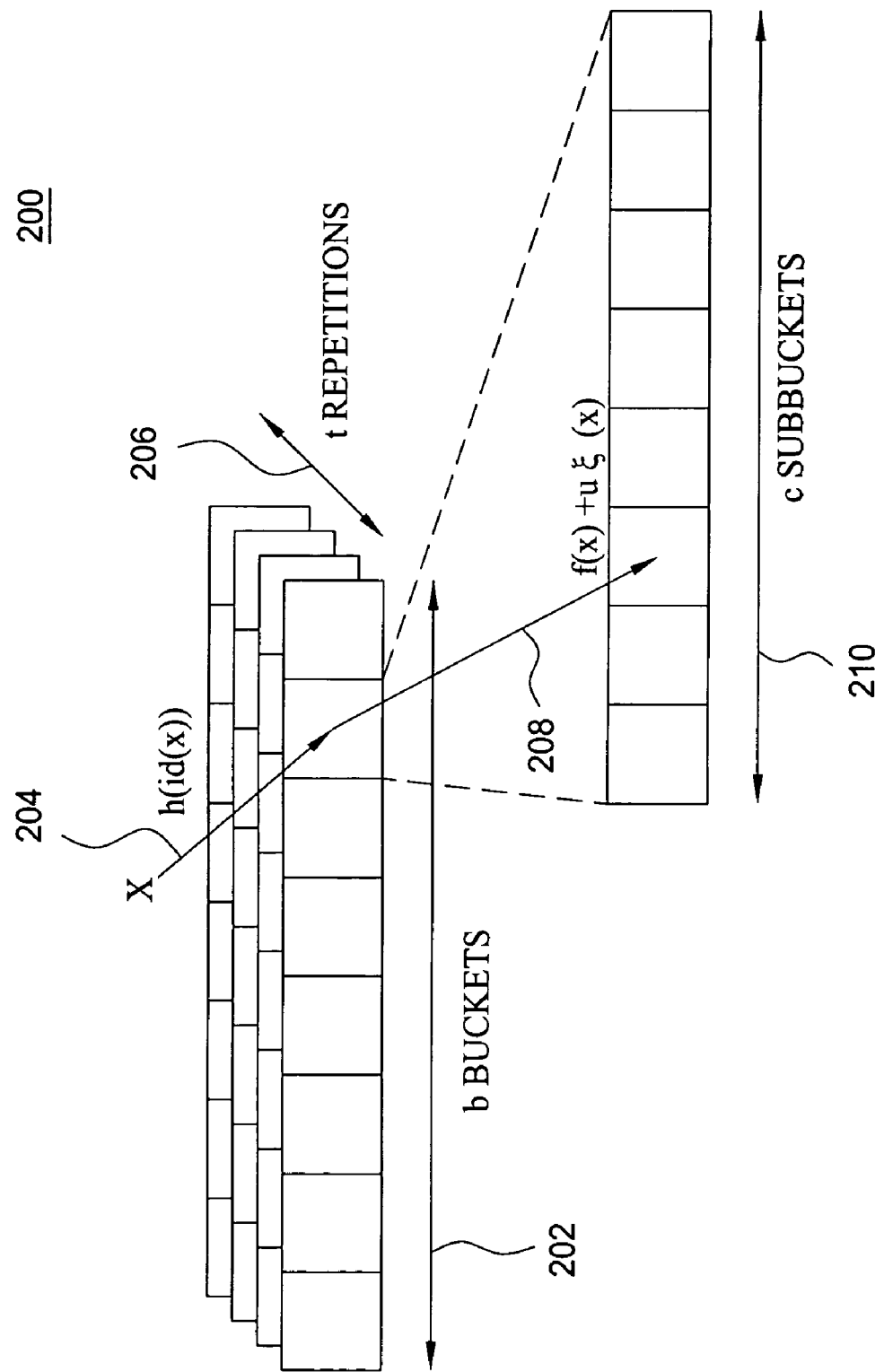
FIG. 2 illustrates the Group-Count Sketch (GCS) data structure.

FIG. 2 illustrates the Group-Count Sketch (GCS) data structure 200, where x 204 is hashed (for t repetitions 206) to one of the buckets 202 and then to one of the sub-buckets 210 within the bucket, where a counter is updated. In one embodiment, GCS data structures 200 hold summary data and they are stored in memory or on a storage device. GCS data structures 200 are used to summarize a very large amount of information that may be received in a sequential fashion. For example, the summary data may be continually updated for each piece of information (e.g., a packet on a network or a transaction in a database system) in a data stream. The GCS data structure 200 is used in exemplary embodiments of methods to construct wavelet representations. Given an array (or equivalently, a vector) that is too large to store in a system with limited resources, GCS data structures 200 allow the array to be broken into fixed size pieces, the size of which may be specified in advance. The GCS data structures 200 may be used so that a function defined to compute the sum of the squares of the values within a particular section of the array. For example, suppose the array is one hundred million items long and it is decided to split the array into pieces that are each one thousand items long (i.e., the first piece contains items 1 . . . , 1000, the second piece contains items 1001, . . . , 2000, etc.). For each piece, the sum of the squares of the values can be determined at a later date. In the incremental update model, every time a piece of information is received from the stream of updates, the corresponding piece is updated (e.g., item 1500).

The GCS data structure 200 comprises buckets 202. A bucket is a collection of one or more arrays of a smaller dimensionality than the input data (i.e., the whole array). The buckets are a way of arranging the data. As shown by arrow 208 in FIG. 2, within each bucket 202 is a collection of sub-buckets 210.

When an update, x 204, (corresponding to item x, e.g., item 1500) is seen in the data stream, there is a two-stage operation. In the first stage, it is determined to which group the update x 204 belongs. The function id(x) maps from the item x into a particular group (e.g., item 1500 belongs to the second group that contains items 1001, . . . , 2000). The hash function h(id(x)) maps from the (large) number of groups into the b number of buckets 202. The hash function allows this mapping to be done into a smaller space to conserve storage, while avoiding collisions to preserve accuracy. In FIG. 2, there are t number of repetitions 206 of buckets, which correspond to t different number of hash functions. In one embodiment, hash functions are chosen to be random-like to avoid collisions. In this way, by choosing random-like hash functions and having t repetitions, when the information is collected together, an accurate estimation of the sum of squares function may be obtained. Any update to the same group will go into the same bucket 202.

Within each bucket 202, more computations are performed based on different hash functions. Within each of the b number of buckets 202, there are c number of sub-buckets 210. A function f(x) determines to which sub-bucket item x belongs. The update value, u, (e.g., +1, size of packet) is associated with item x. The hash function $\xi(x)$ maps onto one of two values, +1 or −1. The sub-bucket contains a counter variable, which is incremented by $u\xi(x)$. This hash function $\xi(x)$ works in such a way so that a later computation of the sum of squares for a group is highly accurate.

One exemplary embodiment is a hash-based probabilistic synopsis data structure called GCS that can estimate the energy (squared $L_2$ norm) of fixed groups of elements from a vector w of size N under a streaming model. To simplify, the one-dimensional case is described, but it is generalized to multiple dimensions. The GCS synopsis requires small, sublinear space and takes sublinear time to process each stream update item. More importantly, a GCS can be used to obtain a high-probability estimate of the energy of a group within additive error $\epsilon\|w\|_2^2$ in sub linear time. GCSs can be used as the basis of efficient streaming procedures for tracking large wavelet coefficients.

A stronger result than the AMS sketching solution for vector $L_2$-norm estimation is needed, namely, the ability to estimate $L_2$ norms for a (potentially large) numbers of groups of items forming a partition of the data domain [N]. A simple solution would be to keep an AMS sketch of each group separately; however, there can be many groups, linear in N, but it requires too much space. Streaming updates need to be processed as quickly as possible. In one embodiment, the solution is to maintain a structure that first partitions items of w into their group and, then, maps groups to buckets using a hash function. Within each bucket, apply a second stage of hashing of items to sub buckets, each containing an atomic AMS sketch counter, in order to estimate the $L_2$ norm of the bucket. Analysis has shown that this approach provides accurate estimates of the energy of any group in w with tight $\pm\epsilon\|w\|_2^2$ error guarantees.

GCS Synopsis

Assume a total of k groups of elements of w that form a partition of [N]. The function id identifies the specific group that element belongs to, id: [N]→[k]. Groups correspond to fixed dyadic ranges over [N] so the id mapping is trivial. Following common data-streaming practice, define a basic randomized estimator for the energy of a group and prove that it returns a good estimate with constant probability $$> \frac{1}{2};$$

then, by taking the median estimate over t independent repetitions, reduce the probability of a bad estimate to exponentially small in t. A basic estimator first hashes groups into b buckets and then, within each bucket, it hashes into c sub-buckets. The values of t, b, and c parameters are determined in the analysis. Furthermore, each item has a $\{\pm t\}$ random variable associated with it. Thus, exemplary embodiments of the GCS synopsis require three sets of t hash functions, $h_m$: [k]→[b], $f_m$: [N]→[c] and am $\xi_m$[N]→$\{\pm 1\}$ (m=1,... t). The randomization requirement is that $h_m$'s and $f_m$'s are drawn from families of pairwise independent functions, while $\xi_m$'s are four-wise independent; such hash functions are easy to implement, and require only $O(\log N)$ bits to store.

In one embodiment, the GCS synopsis s consists of $t \cdot b \cdot c$ counters (i.e., atomic AMS sketches), labeled s[1][1][1] through s[t][b][c], that are maintained and queried as follows:

UPDATE(i,u): Set $s[m][h_m(id(i))][f_m(i)]+=u \cdot \xi_m(i)$, for each m=1, ..., t.

ESTIMATE(GROUP): Return the estimate $$median_{m=1,\ldots,t} \sum_{j=1}^{c} (s[m][h_m(GROUP)][j])^2$$

for the energy of the group of items GROUP $\epsilon\{1, \ldots, k\}$ (denoted by $\|GROUP\|_2^2$). Thus, the updates and query times for a GCS synopsis are simply O(t) and O(t·c) respectively. The following theorem summarizes the key result for the GCS synopsis.

Referring again to FIG. 2, this embodiment of the UPDATE(i,u) function may be carried out on the GCS data structure 200, which is represented by three-dimensional array s in the equation $s[m][h_m(id(i))][f_m(i)]+=u \cdot \xi_m(i)$ In FIG. 2, index m (m=1, ..., t) represents one of the t repetitions 206. The UPDATE(i,u) function updates the GCS data structure 200 for an item i (e.g., item x 204 in FIG. 2) with a corresponding update value of u. The first dimension of array s, which is indexed by m, corresponds to one of those t repetitions 206. For each of those repetitions, m is 1, ... t. For each m, the second index is computed with hash function h(id(i)) and the third index is computed with hash function f(i) and $u\xi(i)$ is added to (+=) the counter variable at that location in three-dimensional array s. Three-dimensional array s is shown in FIG. 2 as the GCS data structure 200 having (t repetitions)×(b buckets)×(c sub-buckets) or t·b·c entries. Thus, the UPDATE(i,u) function locates item i in array s (GCS data structure 200) and performs update u.

For example, an application is tracking traffic in a network by observing one packet after another in a data stream. Each packet has a destination address and a size. It is desired to understand properties of an aggregate of all the data in the data stream. If unlimited resources were available, an enormously large vector could represents this data, where each IP address corresponded to one entry in the vector and within that entry the total count of traffic is updated by adding the size of the packet. By contrast, exemplary embodiments of the present invention use dramatically smaller resources to achieve the same result. For this example, UPDATE(i,u) is computed, where i is the IP address and u is the packet size. UPDATE(i,u) updates the GCS data structure 200, which is represented as a three-dimensional array s. For each of t repetitions (the first index into array s represents the current repetition), the second and third indexes are computed. The second index is determined by mapping 1 down to its group and doing the hash function h( ) on that group value and mapping it to a particular bucket. The third index is determined by taking i, the IP address, doing another hash function f( ) and mapping it onto a particular sub-bucket. That particular sub-bucket identifies a unique counter to update with u, the packet size in this example. The packet size u is multiplied by hash function $\xi($ ) and added to the current counter to complete the update.

In this example, the application is tracking traffic in the network by observing one packet after another in a data stream and calling the UPDATE function for each observed packet. At some point, the application estimates the traffic on the network by calling function ESTIMATE(GROUP) to construct a wavelet representation of the data in order to probe and understand better the traffic distribution. ESTIMATE (GROUP) finds the sum of squares of counts of a particular group in the GCS data structure 200. Again, with unlimited resources and a complete vector of the traffic, to find the sum of squares, each element of the group would be read and the sum of squares would be computed. By contrast, in exemplary embodiments of the present invention estimate that sum of squares using the GCS data structure 200 and the ESTIMATE(GROUP) function. For each (m=1, . . . , t) of the t repetitions 206, a value is computed and, then, a median of those values is computed. For each fixed m, the hash function h( ) for the group is determined by locating a particular bucket 202. Over all of the sub-buckets 210 for that bucket 202, the square of each sub-bucket 210 is computed and the sum of all of those squares is computed, giving an estimated value for one instance. This is done t times for each of the t repetitions and the median is taken of those squared values, i.e., $$median_{m=1,\ldots,t} \sum_{j=1}^{c} (s[m][h_m(GROUP)][j])^2.$$

This information can be used to construct a wavelet representation.

Theorem 2

Exemplary embodiments of the GCS algorithms estimate the energy of item groups of the vector w within additive error $\epsilon \|w\|_2^2$ with the probability $\geq 1-\delta$ using a space of $$O\left(\frac{1}{\epsilon^3} \log \frac{1}{\delta}\right)$$

counters, per-item update time of $$O\left(\log \frac{1}{\delta}\right),$$

and query time of $$O\left(\frac{1}{\epsilon^2} \log \frac{1}{\delta}\right).$$

Proof. Fix a particular group GROUP and a row m in the GCS; drop the row index m in the context where it is understood. Let BUCKET be in the set of elements that hash into the same bucket as GROUP does:

BUCKET={i|i∈[1, n]^(id(i))≠(GROUP)^h(id(i))=h(GROUP)}. Among those, let COLL be the set of elements other than those of GROUP:

COLL={i|i∈[1,n]^id(i)≠GROUP ^ h(id(i))=h(GROUP)}. In the following, both a group and the set of items in the group are referred to with the same name. Also, $\|S\|_2^2$ denotes the sum of squares of the elements (i.e. $L_2^2$) in set S: $\|S\|_2^2 = \Sigma_{i \in S} w[i]^2$.

Let est be the estimator for the sum of squares of the items of GROUP. That is, $$est = \sum_{j=1}^{c} est_j$$

where $est_j = s^2[m][h_m(GROUP)[j]]$ is the square of the count in sub bucket $SUB_j$. The expectation of this estimator is, by simple calculation, the sum of squares of items in sub-bucket j, which is a fraction of the sum of squares of the bucket. Similarly, using linearity of expectation and the four-wise independence of the ξ hash functions, the variance of est is bounded in terms of the square of the expectation:

$$E[est] = E[\|BUCKET\|_2^2] \qquad Var[est] \leq \frac{2}{c} E[\|BUCKET\|_2^4]$$

To calculate $E[\|BUCKET\|_2^2]$, observed that the bucket contains items of GROUP as well as items from other groups denoted by the set COLL, which is determined by h. Because of the pairwise-independence of h, this expectation is bounded by a fraction of the total energy. Therefore:

$$E[\|BUCKET\|_2^2] =$$

$$\|GROUP\|_2^2 + E[\|COLL\|_2^2] \leq \|GROUP\|_2^2 + \frac{1}{b}\|w\|_2^2$$

and $$E[\|BUCKET\|_2^4] =$$

$$\|GROUP\|_2^4 + E[\|COLL\|_2^4] + 2\|GROUP\|_2^2 E[\|COLL\|_2^2] \leq$$

$$\|w\|_2^4 + \frac{1}{b}\|w\|_2^4 + 2\|w\|_2^2 + \frac{1}{b}\|w\|_2^2 \leq \left(1 + \frac{3}{b}\right)\|w\|_2^4 \leq 2\|w\|_2^4$$

because $\|GROUP\|_2^2 \leq \|W\|_2^2$ and $b \geq 3$. The estimator's expectation and variance satisfy $$E[est] \leq \|GROUP\|_2^2 + \frac{1}{b}\|w\|_2^2 \qquad Var[est] \leq \frac{4}{c}\|w\|_2^4.$$

Applying the Chebyshev inequality, $$Pr[|est - E[est]| \geq \lambda \|w\|_2^2] \leq \frac{4}{c\lambda^2}$$

and by setting $$c = \frac{32}{\lambda^2},$$

the bound becomes $$\frac{1}{8},$$

for some parameter λ. Using the above bounds on variance and expectation and the fact that $|a-b| \geq \|a\| - \|b\|$ gives $$|est - E[est]| \geq \left|est - \|GROUP\|_2^2 - \frac{1}{b}\|w\|_2^2\right| \geq \left|est - \|GROUP\|_2^2\right| - \frac{1}{b}\|w\|_2^2.$$

Consequently, by noting that $Pr[|a|>b] \geq Pr[a>b]$, $$Pr\left[\left|est - \|GROUP\|_2^2\right| - \frac{1}{b}\|w\|_2^2 \geq \lambda\|w\|_2^2\right] \leq$$
$$Pr[|est - E[est]| \geq \lambda \leq \|w\|_2^2] \leq \frac{1}{8}$$

or equivalently, $$Pr\left[\left|est - \|GROUP\|_2^2\right| \geq \left(\lambda + \frac{1}{b}\right)\|w\|_2^2\right] \leq \frac{1}{8}.$$

Setting $$b = \frac{1}{\lambda}$$

gives $$Pr[|est - \|GROUP\|_2^2| \geq 2\lambda\|w\|^2] \leq \frac{1}{8}$$

to obtain an estimator with $\epsilon\|w\|_2^2$ additive error requires $$\lambda = \frac{\epsilon}{2},$$

which translates to $$b = O\left(\frac{1}{\epsilon}\right) \text{ and } c = O\left(\frac{1}{\epsilon^2}\right).$$

By Chernoff-bounds, the probability that the median of t independent instances of the estimator deviates by more than $\epsilon\|w\|_2^2$ is less than $e^{-qt}$, for some constant q. Setting this to the probability of failure δ, it is required that $$t = O\left(\log\frac{1}{\delta}\right),$$

which gives the claimed bounds.

Hierarchical Search Structure for Large Coefficients

In one embodiment, the GCS synopsis and estimators are applied to the problem of finding items with large energy (i.e., squared value) in the w vector. Because the GCS works in the wavelet domain (i.e., sketches the wavelet coefficient vector), this is exactly the problem of recovering important coefficients. To recover large-energy items efficiently, impose a regular tree structure on top of the data domain [N], such that every node has the same degree r. Each level in the tree induces a partition of the nodes into groups corresponding to r-adic ranges, defined by the nodes at that level. Thus, the id the function for level l is easily defined as $id_l$ $$(i) = \left[\frac{1}{r^l}\right].$$

For instance, a binary tree creates groups corresponding to dyadic ranges of size 1, 2, 4, 8, and so one. The basic idea for this embodiment is to perform a search over the tree for those high-energy items above a specified energy threshold, $\phi\|w\|_2^2$. Groups with energy below the threshold are pruned and, thus, it is not necessary to look inside those groups: if the estimated energy is accurate, then these cannot contain any high-energy elements. One result is that, using a hierarchical search structure of GCSs, it can provably (within appropriate probability bounce) retrieve all items above the threshold plus a controllable error quantity $((\phi+\epsilon)\|w\|_2^2)$, and retrieve no elements below the threshold minus that small error quantity $((\phi-\epsilon)\|w\|^2)$.

Theorem 3

Given a vector w of size N, it can be reported, with high probability $\geq 1-\delta$, all elements with energy above $(\phi+\epsilon)\|W\|_2^2$ (where $\phi \geq \epsilon$) within additive error of $\epsilon \geq \|w\|^2$ (and therefore, report no item with energy below $(\phi-\epsilon)\|w\|^2$) using space of $$O\left(\frac{\log_r N}{\epsilon^3} \cdot \log\frac{r\log_r N}{\phi\delta}\right),$$

per item processing time of $$O\left(\log_r N \cdot \log\frac{r\log_r N}{\phi\delta}\right)$$

and query time of $$O\left(\frac{r}{\phi\epsilon^2} \cdot \log_r N \cdot \log\frac{r\log_r N}{\phi\delta}\right).$$

Proof. Construct $\log_r N$ GCSs (with parameters to be defined), one for each level of the r-ary search-tree structure. An element that has energy above $\phi\|w\|^2$ is referred to as a "hot element" and, similarly, groups that have energy above $\phi\|w\|^2$ are referred to as "hot ranges". One observation is that all r-adic ranges that contain a hot element are also hot. Therefore, at each level (starting with the root level), hot r-adic ranges are identified by examining only those r-adic ranges that are contained in hot ranges of the previous level. Because there can be at most $$\frac{1}{\phi}$$

hot elements, it is only necessary to examine at most $$\frac{1}{\phi}\log_r$$

N ranges and pose that many queries. Thus, the failure probability is required to be $$\frac{\log_r n}{\phi \delta}$$

for each query so that, by the union bound, a failure probability of at most δ is obtained for reporting all hot elements. Further, each level is required to be accurate to within $\epsilon\|w\|_2^2$ so that all hot elements above $(\phi+\epsilon)\|w\|_2^2$ and none below $(\phi-\epsilon)\|w\|_2^2$ are obtained. The theorem follows.

In one embodiment, setting the value of r gives a trade-off between query time and update time. Asymptotically, the update time decreases as the degree of the tree structure, r, increases. This becomes more pronounced in practice, because it usually suffices to set t, the number of tests, to a small constant. Under this simplification, the update costs essentially reduce to $O(\log_r N)$, and the query time reduces to $$O\left(\frac{r}{\epsilon^2 \phi} \log_r N\right).$$

This was shown in the experimental analysis. The extreme settings of r are 2 and N:r=2 imposes a binary tree over the domain, and gives the fastest query time, but $O(\log_2 N)$ time per update; r=N means updates are effectively constant O(1) time, but querying requires probing the whole domain, a total of N tests to the sketch.

Sketching in the Wavelet Domain

Given an input update-stream for data entries in a, exemplary embodiments of the algorithms build GCS synopses on the corresponding wavelet coefficient vector $w_a$, and then employ these GCSs to quickly recover a (provably good) approximate β-term wavelet representation of a. To accomplish the first step, an efficient way of "translating" updates is needed in the original data domain to the domain of wavelet coefficients (for both one-dimensional and multi-dimensional data streams).

One-Dimensional Updates

An update (1,v) on a translates to the following collection of log N+1 updates to wavelet coefficients (that lie in the path to leaf a[i], FIG. 1A):

$$\left(0, 2^{\frac{-1}{2}\log N} u\right), \left\{\left(2^{\log N-1} + k, (-1)^{k \bmod 2} 2^{\frac{-1}{2}} u\right)\right.$$

for each l=0, ..., log N−1}), where l=0, ..., log N−1 indexes the resolution level, and $k=[i2^{-l}]$ the above set is a fully computed in constant time.

Multi-Dimensional Updates

Using the same reasoning as above produces a collection of (constant-time) wavelet-coefficient updates for a given data update in d dimensions (see FIG. 1B). The size of this collection of updates in the wavelet domain is $O(\log^d N)$ and $O(2^d \log N)$ for standard and non-standard Haar wavelets, respectively. A subtle issue here is that the search-tree structure operates over a linear ordering of the $N^d$ coefficients, so a fast method for linearizing the multi-dimensional coefficient array is needed. Any simple linearization technique will work (e.g., Row-major ordering or other space-filling curves).

Using GCSs for Approximate Wavelets

One goal is to recover the β most significant Haar DWT coefficients (approximately), without exhaustively searching through all coefficients. As shown in Theorem 3, creating GCSs for dyadic ranges over the (linearized) wavelet-coefficient domain, allows high-energy coefficients to be efficiently identified. The degree of the search structure is fixed to r=2 in the following for simplicity. An important technicality is to select the right to threshold for coefficient energy in the search process, so that the final collection of recovered coefficients provably captures most of the energy in the optimal β-term representation. The analysis in the following theorem shows how to set this threshold, and proves that for data vectors satisfying in the "small-β property", exemplary embodiments of the GCS technique can efficiently track near-optimal approximate wavelet representations. The result for the standard form of the multi-dimensional Haar DWT is presented. The one-dimensional case follows as the special case d=1.

Theorem 4 if a d-dimensional data stream over the $[N]^d$ domain has a β-term standard wavelet representation with energy at least $\eta\|a\|_2^2$, where $\|a\|_2^2$ is the entire energy, then exemplary embodiments of the GCS algorithms can estimate an at most β-term standard wavelet representation with energy, at least $(1-\epsilon)\eta\|a\|_2^2$ using space of $$O\left(\frac{B^3 d \log N}{\epsilon^3 \eta^3} \cdot \log \frac{Bd\log N}{\epsilon \eta \delta}\right),$$

per item processing time of $$O\left(d\log^{d+1} N \cdot \log \frac{Bd\log N}{\epsilon \eta \delta}\right),$$

and query time of $$O\left(\frac{B^3 d}{\epsilon^3 \eta^3} \cdot \log N \cdot \log \frac{Bd\log N}{\epsilon \eta \delta}\right).$$

Proof. Using of the GCS search algorithm, and Theorem 3 to find all coefficients with energy at least $$\frac{\varepsilon\eta}{\beta}\|a\|_2^2 = \frac{\varepsilon\eta}{\beta}\|w\|_2^2.$$

It is noted that $\|a\|_2^2$ can be easily estimated to within small relative error from the GCSs. Among those, choose the highest $\beta$ coefficients; there could be less than $\beta$ found. For those coefficients selected, two types of error are incurred. Suppose a coefficient is chosen, which is included in the best $\beta$-term representation; then it would be inaccurate by it most $$\frac{\varepsilon\eta}{\beta}\|a\|_2^2.$$

Now, suppose coefficient $c_1$ is chosen, which is not in the best $\beta$-term representation. There has to be a coefficient $c_2$ that is in the best $\beta$-term representation, but was rejected in favor of $c_1$. For this rejection to have taken place, their energy must differ by at most $$2\frac{\varepsilon\eta}{\beta}\|a\|_2^2$$

by the bounds on the accuracy of estimation for groups of size 1. Finally, for any coefficient not chosen (for the case when fewer than $\beta$ coefficients are chosen) its true energy must be less than $$2\frac{\varepsilon\eta}{\beta}\|a\|_2^2.$$

It follows that the total energy obtained is at most $2\varepsilon\eta\|a\|_2^2$ less than that of the best $\beta$-term representation.

Setting parameters $\lambda, \varepsilon', N'$ of Theorem 3 to $$\lambda = \varepsilon' = \frac{\varepsilon\eta}{\beta}$$

and $N'=N^d$, the stated space and query time bounds are obtained. For the per-item update time, a single update in the original data domain requires $O(\log^d N)$ coefficient updates.

The corresponding result for the non-standard Haar DWT follows along the same lines. The only difference with Theorem 4 comes in the per-update processing time, which, in the non-standard case, is $$O\left(d2^d \log N \cdot \log \frac{Bd \log N}{\varepsilon\eta\delta}\right).$$

Experiments

Data Sets and Methodology

Exemplary embodiments of the algorithms were implemented in a mixture of C. and C++ for the GCS with variable degree. For comparison, the method of GKMS was also implemented as well as a modified version of the algorithm with faster update performance using ideas similar to those in the GCS, which is denoted by fast-GKMS. Experiments were performed on a 2 GHz processor machine with 1 GB of memory. A mixture of real and synthetic data was used. Synthetic Zipfian data was used to generate data from arbitrary domain sizes and with varying skewness. By default, the skewness parameter of the distribution is $z=1.1$. A meteorological data set comprised $10^5$ meteorological measurements. These were quantized and projected appropriately to generate data sets with dimensionalities between one and four. For the experiments, the air temperature and wind speed attributes were primarily used to obtain the one-dimensional and two-dimensional data streams.

In the experiments, the domain size, the size of the sketch, and the degree of the search tree of the GCS method was varied. The following was measured: (1) per-item update time, (2) query time, and (3) accuracy. In FIGS. 3A-3D, GCS-k denotes that the degree of the search tree is $2^k$; i.e., GCS-1 uses a binary search tree, whereas the GCS-logn uses an n-degree tree, and so has a single level consisting of the entire wavelet domain.

One-Dimensional Experiments

Figure 3A:
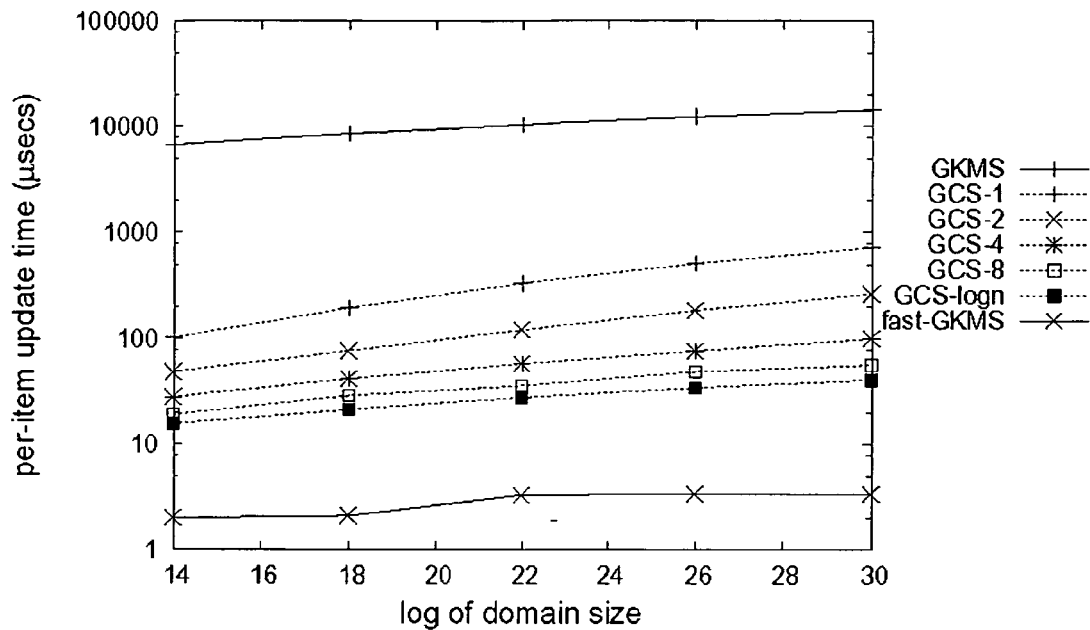
FIGS. 3A, 3B, 3C, and 3D are charts showing performance results on one-dimensional data.
Figure 3B:
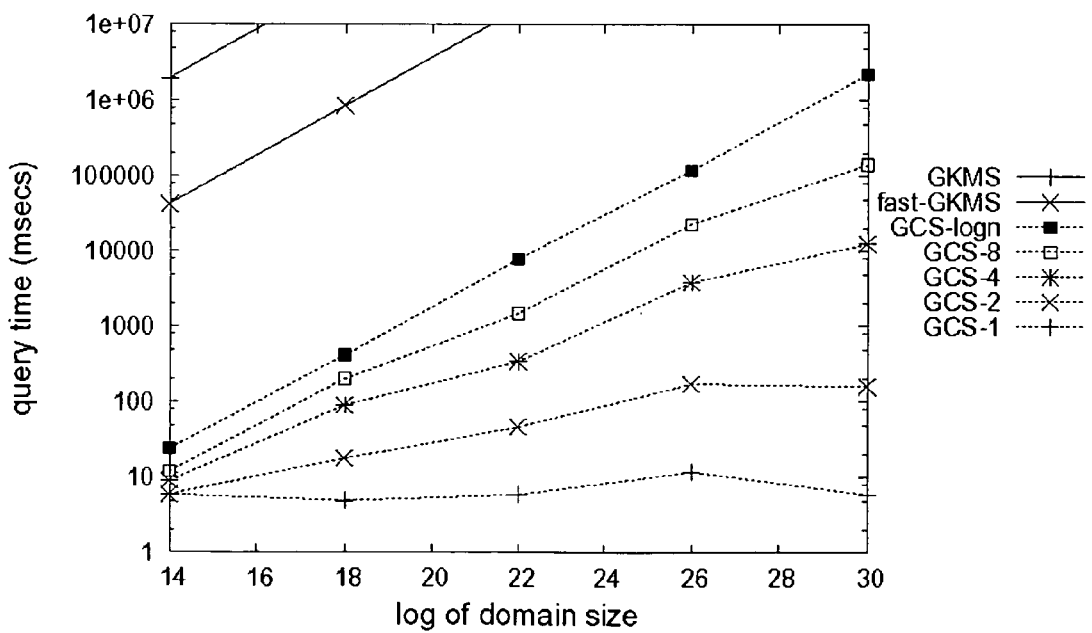

In the first experimental set up, a synthetic one-dimensional data stream with updates following the Zipfian distribution ($z=1.1$) was used. Space was increased based on the log of the dimension, so for log N=14 280 kB was use up to 600 kB for log N=30. FIG. 3A shows the per-item update time for various domain sizes and FIG. 3B shows the time required to perform a query, asking for the top-five coefficients. The GKMS method took orders of magnitude longer for both updates and queries, and this behavior was seen in all other experiments, so it is not considered further. Apart from this, the ordering (fastest to slowest) is reversed between update time and query time. Varying the degree of the search tree, allowed tradeoffs between update time and query time. While the fast-GKMS approach was the fastest for updates, it was dramatically more expensive for queries, by several orders of magnitude. For demands of size $2^{22}$, it took several hours to recover the coefficients and extrapolating to a 32-bit domain meant recovery would take over week. Clearly, this was not practical for realistic monitoring scenarios. Although GCS-logn also performed exhaustive search over the demand size, its query times were significantly lower as it did not require a sketch construction and inner-product query per wavelet coefficient.

Figure 3C:
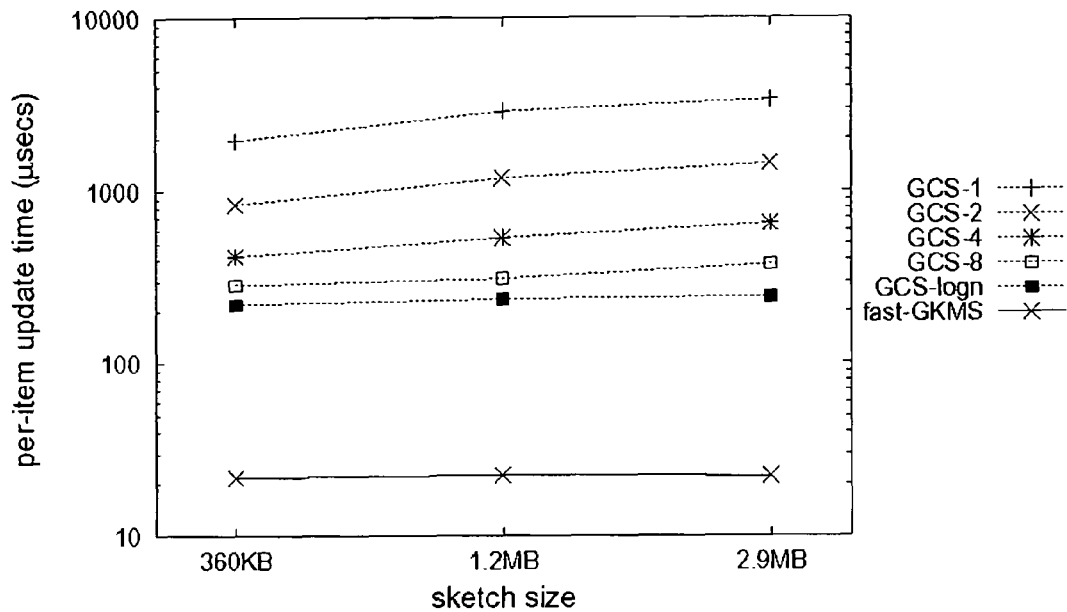
Figure 3D:
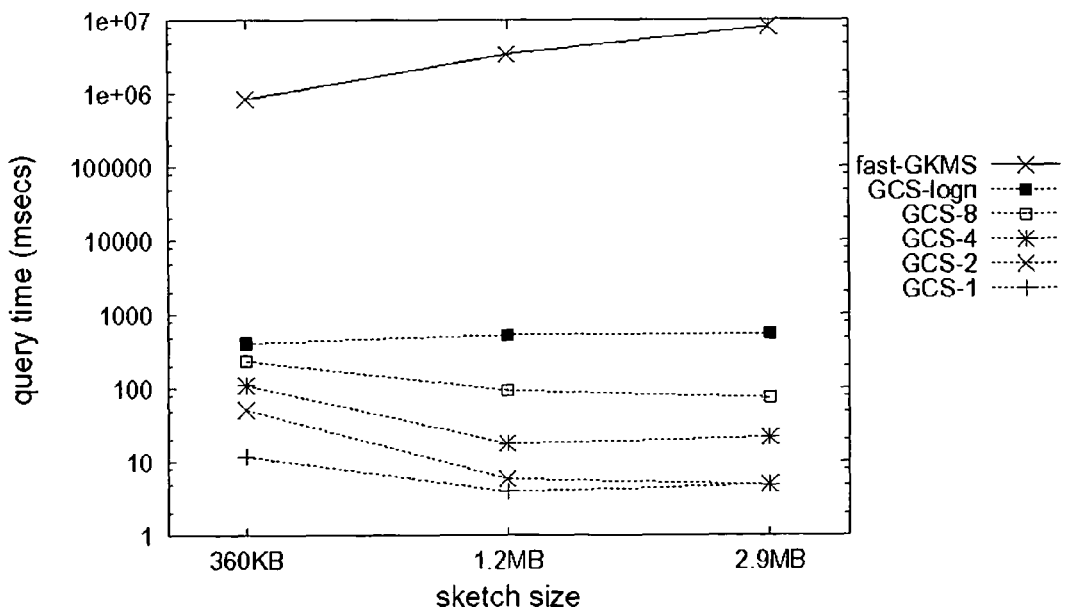
Figure 4A:
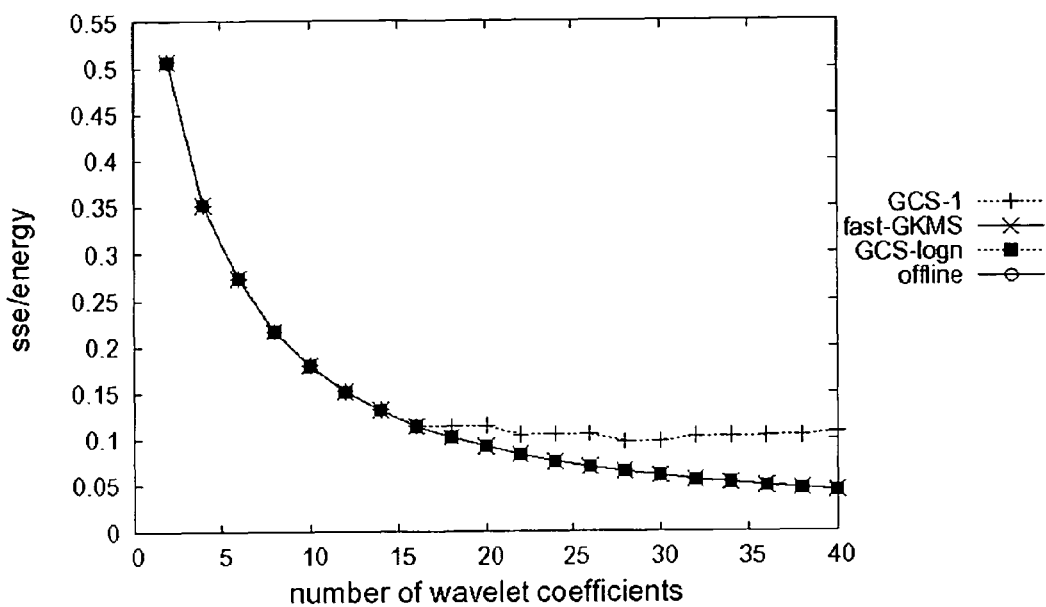
FIGS. 4A and 4B are charts showing measured accuracy of wavelet synopses.
Figure 4B:
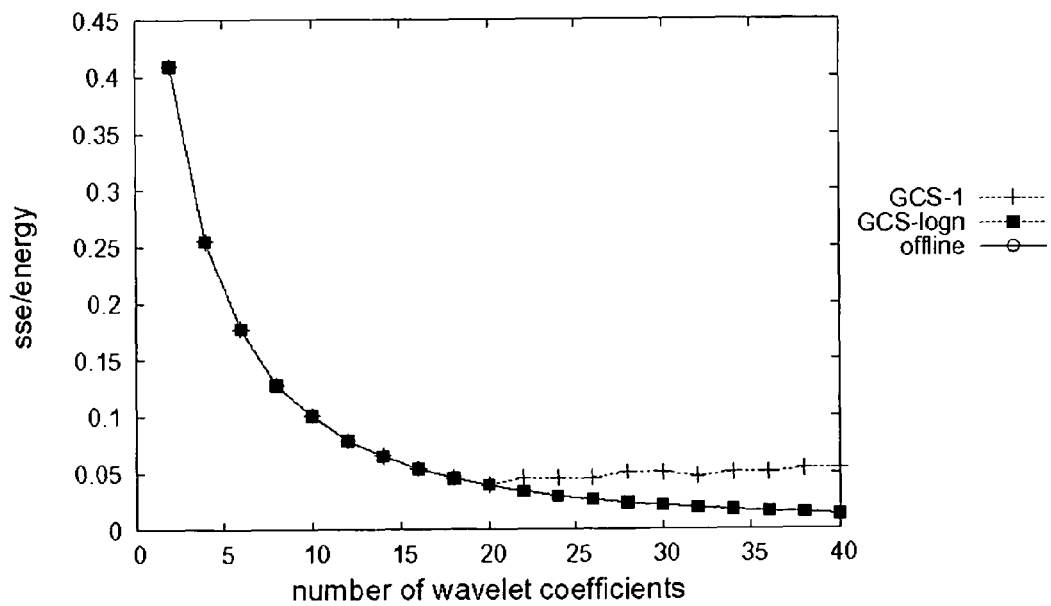
Figure 5A:
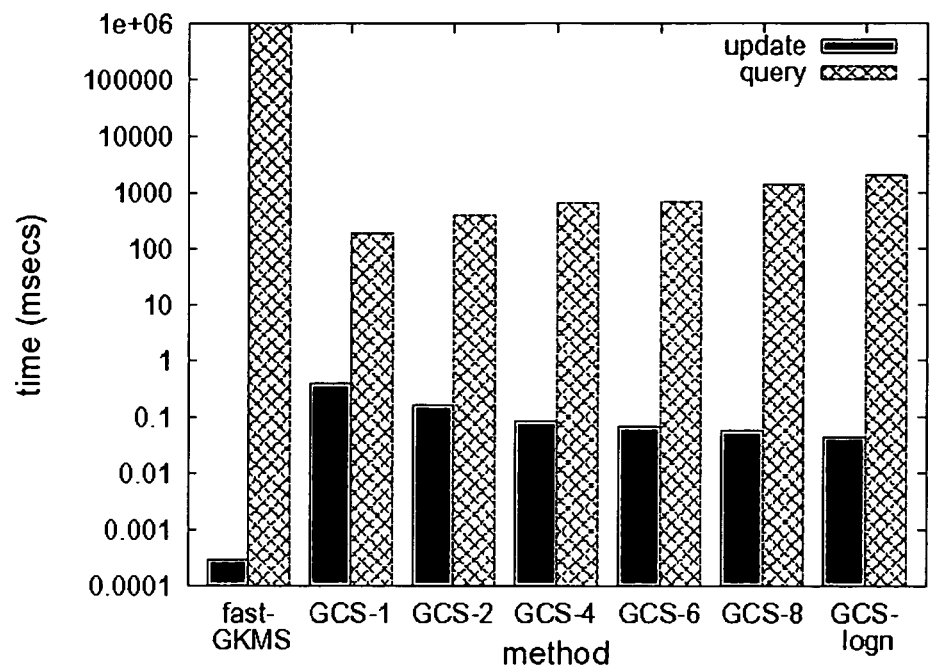
FIGS. 5A, 5B, 5C, and 5D are charts showing performance results on one-dimensional real data and multi-dimensional real and synthetic data.

FIGS. 3C and 3D show the performance as the sketch size is increased. The domain size was fixed to $2^{18}$ so that the fast-GKMS method would complete a query in reasonable time. Update times did not vary significantly with increasing space, in line with the analysis (some increase in cost may have been seen due to cache effects). The accuracy of the approximate wavelet synopsis for each method was tested. The SSE-to-energy ratio of the estimated $\beta$-term synopses for varying $\beta$ and varying zipf parameter were measured and compared against the optimal $\beta$-term synopsis computed off-line. The results are shown in FIGS. 4A and 4B, where each sketch was given space of 360 kB. In accordance with the analysis, (GCS required $$O\left(\frac{1}{\varepsilon}\right)$$

times more space to provide the same guarantees with GKMS. The GKMS method was slightly less accurate when estimating more than the top 15 coefficients. However, experiments showed that increasing the size to 1.2 MB resulted in equal accuracy. Finally, the performance of the methods were tested on single dimensional meteorological data of domain size $2^{20}$. Per-item and query times in FIG. 5A were similar to those on synthetic data.

Multi-Dimensional Experiments

Figure 5B:
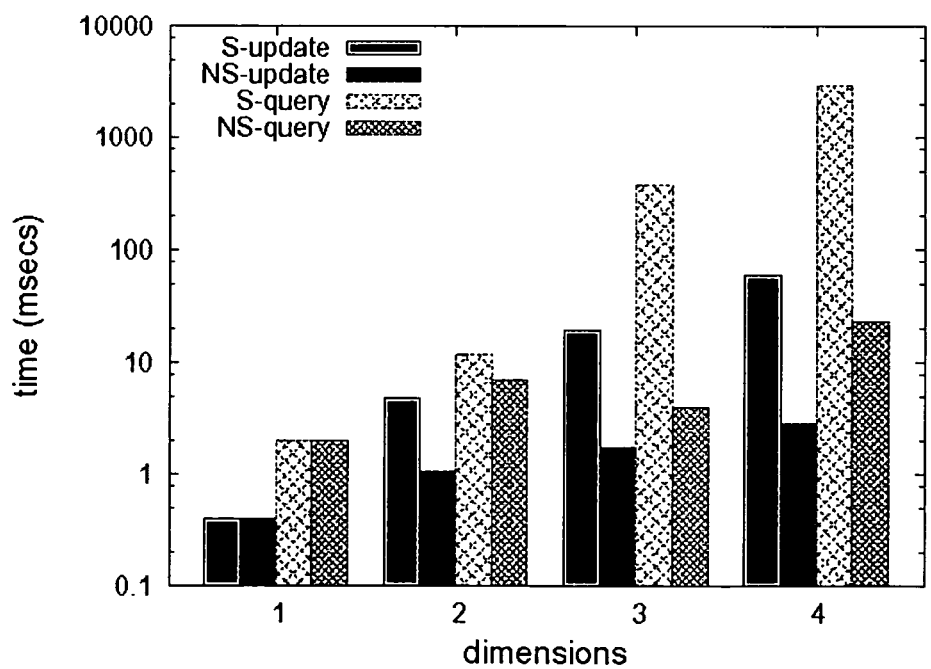
Figure 5C:
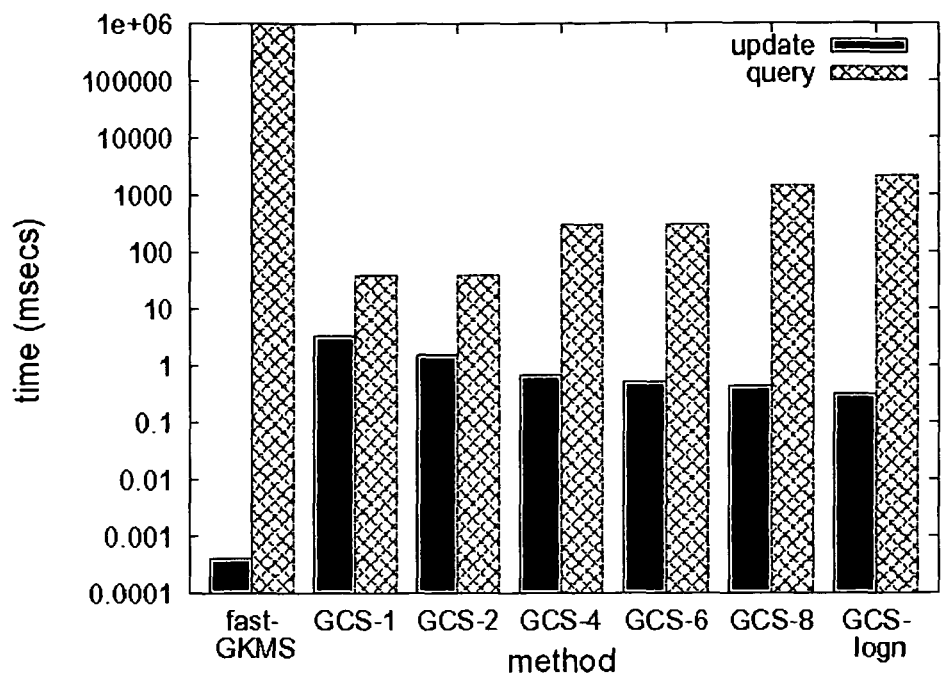
Figure 5D:
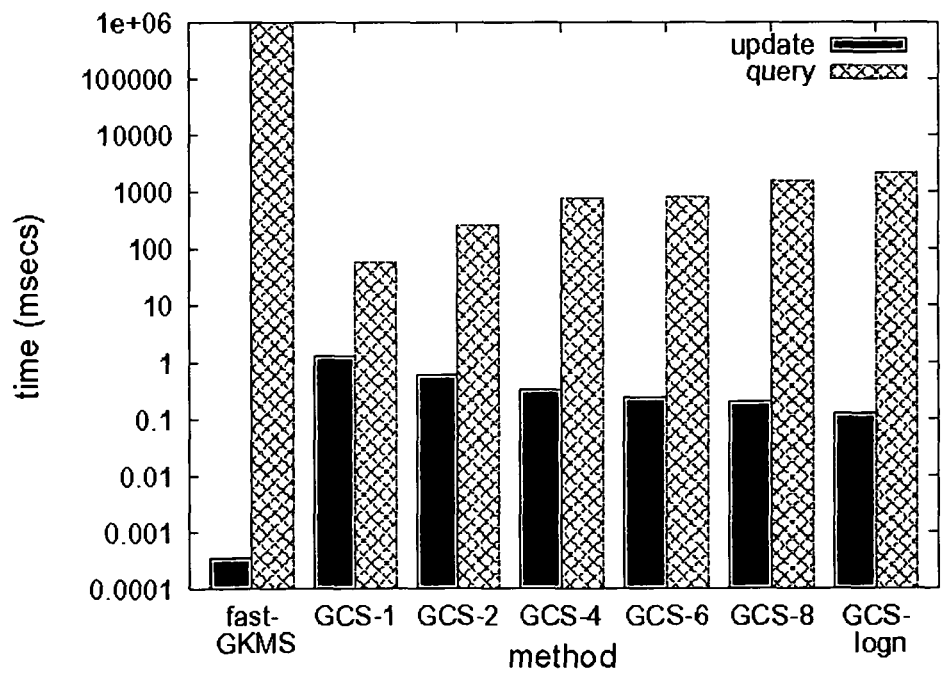

Exemplary embodiments of the methods for both wavelet decomposition types were compared in multiple dimensions. First, the GCS method for synthetic data set (z=1.1, $10^5$ tuples) of varying dimensionality was tested. In FIG. 5B, the total domain size was kept constant that $2^{24}$, while dimensions were varied between one and four. The per-item update time was higher for the standard decomposition, as there were more updates on the wavelet domain per update on the original domain. The increase in query time was attributed to the increasing sparseness of the domain as the dimensionality increased, which made searching for big coefficients harder. This is a well-known effect of multidimensional standard and non-standard decompositions. For the two dimensional case in the real data set, higher dimensions were similar. FIGS. 5C and 5D show results for the standard and non-standard decompositions, respectively. The difference between the exemplary embodiments of the GCS method and the fast-GKMS was more pronounced, because of the additional work in producing multidimensional wavelet coefficients, but the query times remained significantly less (query times were in the order of hours for fast-GKMS) and the difference became many times greater as the size of the data domain increased.

Experimental Summary

The GCS approach was the only method that achieved reasonable query times to return an approximate wavelet replication of data drawn from a moderately large domain ($2^{20}$ or larger). The first implementation was capable of processing tens to hundreds of thousands of updates per second and giving the answer to queries in the order of a few seconds. Varying the degree of the search tree allowed a tradeoff between query time and update time to be established. The observed accuracy was almost indistinguishable from the exact solution and the methods extended smoothly to multiple dimensions with little gradation of performance.

Exemplary Embodiments include algorithms for space- and time-efficient tracking of approximate wavelet summaries for both one-dimensional and multi-dimensional data streams. The approach includes the GCS synopsis that, unlike earlier work, satisfies the three requirements of effective streaming algorithms, namely: (1) polylogarithmic space usage, (2) small, logarithmic update times (especially touching on only a small fraction of the GCS for each streaming update), and (3) polylogarithmic query times for computing the top wavelet coefficients from the GCS. Experimental results with both synthetic and real-life data have verified the effectiveness of this approach, demonstrating the ability of GCSs to support very high-speed data sources.

Figure 6:
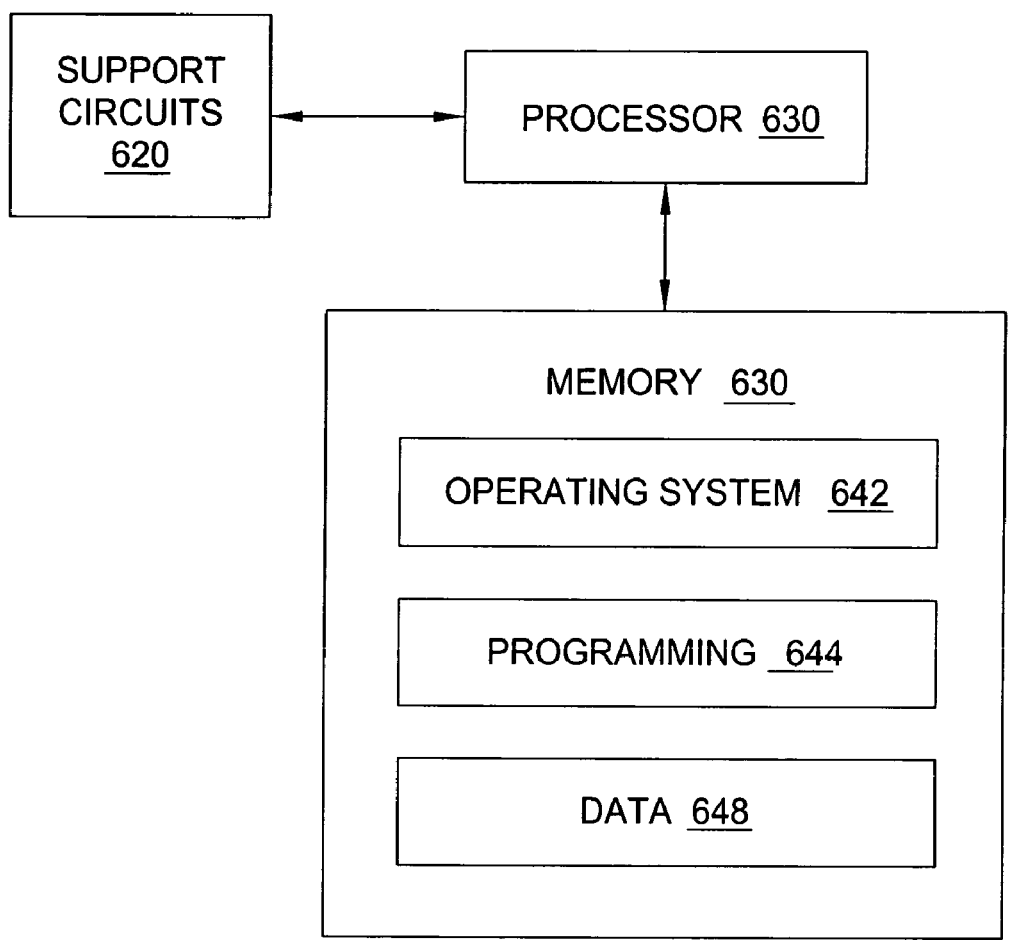
FIG. 6 is a high-level block diagram showing a computer.

FIG. 6 is a high-level block diagram showing a computer. The computer 600 may be employed to implement embodiments of the present invention. The computer 600 comprises a processor 630 as well as memory 640 for storing various programs 644 and data 646. The memory 640 may also store an operating system 642 supporting the programs 644.

The processor 630 cooperates with conventional support circuitry such as power supplies, clock circuits, cache memory and the like as well as circuits that assist in executing the software routines stored in the memory 640. As such, it is contemplated that some of the steps discussed herein as software methods may be implemented within hardware, for example, as circuitry that cooperates with the processor 630 to perform various method steps. The computer 600 also contains input/output (I/O) circuitry that forms an interface between the various functional elements communicating with the computer 600.

Although the computer 600 is depicted as a general purpose computer that is programmed to perform various functions in accordance with the present invention, the invention can be implemented in hardware as, for example, an application specific integrated circuit (ASIC) or field programmable gate array (FPGA). As such, the process steps described herein are intended to be broadly interpreted as being equivalently performed by software, hardware, or a combination thereof.

The present invention may be implemented as a computer program product wherein computer instructions, when processed by a computer, adapt the operation of the computer such that the methods and/or techniques of the present invention are invoked or otherwise provided. Instructions for invoking the inventive methods may be stored in fixed or removable media, transmitted removable media, and/or stored within a working memory within a computing device operating according to the instructions.

While the foregoing is directed to various embodiments of the present invention, other and further embodiments of the invention may be devised without departing from the basic scope thereof. As such, the appropriate scope of the invention is to be determined according to the claims, which follow.

What is claimed is:

1. A computer-implemented method for approximate wavelet tracking, comprising:
   sketching a wavelet coefficient vector as updates arrive in a streaming model;
   performing updates by using a hash-based grouping and search technique on a group-count sketch (GCS) synopsis comprising a three-dimensional array indexed by a repetition index, a bucket index, and a sub-bucket index; and
   providing an estimate of an energy of at least one group of elements from the wavelet coefficient vector.

2. The method of claim 1, further comprising:
   using the GCS synopsis to track a set of large wavelet coefficients.

3. The method of claim 2, wherein the set of large wavelet coefficients are identified in polylogarithmic time.

4. The method of claim 1, wherein the hash-based group and search technique comprises:
   for each repetition, computing the bucket index using a first hash function and computing the sub-bucket index using a second hash function; and
   locating an element to update in the GCS synopsis with the bucket index and the sub-bucket index.

5. The method of claim 1, wherein a synopsis space is sublinear, a per-item update time is sublinear, and a query time is sublinear.

6. A system for approximate wavelet tracking, comprising:
   a processor;
   a sketching component causing the processor to sketch a wavelet coefficient vector as updates arrive in a streaming model;
   an update component causing the processor to perform updates by using a hash-based grouping and search technique on a group-count sketch (GCS) synopsis comprising a three-dimensional array indexed by a repetition index, a bucket index, and a sub-bucket index; and an estimator causing the processor to provide an estimate of an energy of at least one group of elements from the wavelet coefficient vector.

7. The system of claim 6, further comprising:
a tracker for using the GCS synopsis to track a set of large wavelet coefficients.

8. The system of claim 7, wherein the set of large wavelet coefficients are identified in polylogarithmic time.

9. The system of claim 6, wherein the hash-based group and search technique comprises:
for each repetition, computing the bucket index using a first hash function and computing the sub-bucket index using a second hash function; and
locating an element to update in the GCS synopsis with the bucket index and the sub-bucket index.

10. The system of claim 6, wherein a synopsis space is sublinear, a per-item update time is sublinear, and a query time is sublinear.

11. A computer readable medium storing instructions for performing a method for approximate wavelet tracking, the method comprising:
sketching a wavelet coefficient vector as updates arrive in a streaming model;
performing updates by using a hash-based grouping and search technique on a group-count sketch (GCS) synopsis comprising a three-dimensional array indexed by a repetition index, a bucket index, and a sub-bucket index; and
providing an estimate of an energy of at least one group of elements from the wavelet coefficient vector.

12. The computer readable medium of claim 11, further comprising:
using the GCS synopsis to track a set of large wavelet coefficients.

13. The computer readable medium of claim 12, wherein the set of large wavelet coefficients are identified in polylogarithmic time.

14. The computer readable medium of claim 11, wherein the hash-based group and search technique comprises:
for each repetition, computing the bucket index using a first hash function and computing the sub-bucket index using a second hash function; and
locating an element to update in the GCS synopsis with the bucket index and the sub-bucket index.

15. The computer readable medium of claim 11, wherein a synopsis space is sublinear, a per-item update time is sublinear, and a query time is sublinear.

* * * * *